US012774788B2

(12) United States Patent
Schmieder et al.

(10) Patent No.: US 12,774,788 B2
(45) Date of Patent: Oct. 27, 2026

(54) VALVE DEVICE WITH TILTABLE GUIDE ELEMENT, AND FLUID SYSTEM

(71) Applicant: Robert Bosch GmbH, Stuttgart (DE)

(72) Inventors: Dietmar Schmieder, Markgroeningen (DE); Mathias Haenel, Altbach (DE)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 18/837,391

(22) PCT Filed: Jan. 10, 2023

(86) PCT No.: PCT/EP2023/050397
§ 371 (c)(1),
(2) Date: Aug. 9, 2024

(87) PCT Pub. No.: WO2023/160890
PCT Pub. Date: Aug. 31, 2023

(65) Prior Publication Data

US 2025/0189080 A1 Jun. 12, 2025

(30) Foreign Application Priority Data

Feb. 25, 2022 (DE) ..................... 10 2022 201 957.1

(51) Int. Cl.
*F17C 13/04* (2006.01)

(52) U.S. Cl.
CPC ...... *F17C 13/04* (2013.01); *F17C 2205/0326* (2013.01); *F17C 2205/0382* (2013.01); *F17C 2221/012* (2013.01)

(58) Field of Classification Search
CPC ....................................................... F17C 13/04
See application file for complete search history.

(56) References Cited

U.S. PATENT DOCUMENTS

| | | | |
|---|---|---|---|
| 4,699,351 A | 10/1987 | Wells | |
| 2014/0239207 A1 | 8/2014 | Ninomiya et al. | |
| 2015/0184805 A1 | 7/2015 | Lee | |
| 2018/0038507 A1 | 2/2018 | Ninomiya et al. | |
| 2019/0061718 A1* | 2/2019 | Hattori ................ | F16K 31/0655 |

FOREIGN PATENT DOCUMENTS

| | | |
|---|---|---|
| JP | 5178653 B2 * | 4/2013 |
| WO | 2020120074 A1 | 6/2020 |

OTHER PUBLICATIONS

JP5178653B2 English Machine Translation (Year: 2013).*
Translation of International Search Report for Application No. PCT/EP2023/050397 dated May 31, 2023 (2 pages).

* cited by examiner

*Primary Examiner* — Nicole Gardner
(74) *Attorney, Agent, or Firm* — Michael Best & Friedrich LLP

(57) ABSTRACT

A valve device for a fluid system includes a valve unit with a valve seat and a valve body, which contacts the valve seat in a closed state of the valve unit in order to close the valve opening and in an open state is remote from the valve seat in order to clear the valve opening for a fluid flow in the fluid system. A guide unit has a guide element, which is connected to the valve body and can be moved along a movement axis in order to transfer the valve unit from the closed state into the open state, and has a counter-guide element for guiding the guide element along the movement axis.

8 Claims, 3 Drawing Sheets

VALVE DEVICE WITH TILTABLE GUIDE ELEMENT, AND FLUID SYSTEM

BACKGROUND

The invention relates to a valve device for a fluid system, as well as a fluid system.

Known from the prior art are valve devices which can be transferred from an open state to a closed state by pressing a valve ball onto a valve seat. However, this regularly results in a tolerance-related coaxiality, which is usually compensated for by a radial gap in a guide of the valve needle. However, especially in conjunction with a magnetic drive, a large radial gap leads to higher demands on the drive, such as a larger solenoid coil and/or higher current requirements. Furthermore, the radial play between the valve ball and the valve seat can cause increased wear and higher noise emissions.

SUMMARY

Provided according to a first aspect of the invention is a valve device for a fluid system. The fluid system comprises a valve unit with a valve seat and a valve body which contacts the valve seat in a closed state of the valve unit to close a valve opening and is remote from the valve seat in an open state to clear the valve opening for a fluid flow in the fluid system. The valve device further comprises a guide unit with a guide element which is connected to the valve body and can be moved along a movement axis in order to transfer the valve unit from the closed state to the open state. The guide unit also comprises a counter-guide element for guiding the guide element along the movement axis. The guide unit comprises a tilting means, by means of which the guide element can be tilted, i.e. preferably aligned at an angle, to the movement axis for contacting, in particular in the closed state, between the valve seat and the valve body.

As a result, the disadvantages known from the prior art are at least partially eliminated. In particular, the valve device according to the invention achieves improved guidance of a valve body when opening and/or closing a valve unit of the valve device.

The fluid flow can be a gas or a liquid. Preferably, the fluid flow comprises hydrogen.

In particular, the valve unit is arranged between a valve inlet for the inflow of the fluid flow and a valve outlet for the outflow of the fluid flow. In particular, the valve opening is part of the valve unit. The valve opening comprise have a cross-section, through which the fluid flow can pass when the valve unit is in open state. In closed state, the valve body can be pressed onto the valve seat. Preferably, the valve opening is completely closed in closed state. However, it is conceivable that a leakage flow can continue to flow through the valve opening in the closed state.

In particular, the valve seat is designed to move with the guide element. The valve seat can be designed to be stationary. The movement axis can comprise a central axis of the guide unit, along which the guide element and/or the valve body moves when the valve unit is transferred from the closed state to the open state and/or vice versa. The movement axis can form a central axis of the guide element and/or the valve body.

In particular, the guide unit can comprise a linear guide. For example, the guide element can be slidingly mounted in the valve body. It can be provided that a gap is formed between the guide element and the counter-guide element. When the guide element is tilted, at least sections of the guide element can extend into the gap. In particular, the tilting of the guide element can be understood to mean that the guide element and/or the valve body is at an angle to the movement axis, meaning that it can preferably be aligned at an angle to the movement axis for tilting. The guide element can preferably rotate around a center of rotation, i.e., in particular a pivot point or an instantaneous pole, on the movement axis.

The tilting means can define the center of rotation. Furthermore, the tilting means can be integrated into the guide element or the counter-guide element. When tilting, the tilting means can contact the guide element or the counter-guide element, in particular permanently or temporarily. Preferably, a gap exists between the guide means and the counter-guide means. The gap can have the smallest cross-section in the area of the tilting means.

Preferably, the guide element and the counter-guide element can form a cardan joint through the tilting means. Tilting can occur in particular when the valve unit is transferred from the open state to the closed state or vice versa. Tilting can compensate for a coaxiality of the valve body and/or the movement axis to the valve seat, in particular due to tolerances. The tilting means can minimize or eliminate the gap between the guide means and the counter-guide means. The change of state of the valve unit between the open state and the closed state can be simplified as a result. For example, requirements for a drive unit can be reduced. Furthermore, the guidance provided by the guide unit can be improved so that wear and/or noise emissions can be reduced.

In a valve device according to the invention, it is also conceivable that at least sections of (or all of) the valve seat comprise a conical support surface for the valve body, whereby at least sections of (or all of) the valve body comprise a round or completely contact surface, in which case the contact surface rests on the support surface in the closed state of the valve unit. In particular, the contact surface can slide along the support surface to close the valve opening when the valve unit is transferred from the open state to the closed state, whereby the guide element can be tilted in relation to the counter-guide element and/or the movement axis. In the closed state, the support surface and the contact surface can contact each other circumferentially in order to seal the valve opening. In particular, at least sections of the contact surface can be designed to be spherical. The contact surface can comprise one or more ball segments, ball cut-outs and/or ball rings. However, it is also conceivable that the valve body is designed entirely as a ball. The support surface can, e.g., be designed as a truncated cone. The valve opening is in this case preferably located in the center of the conical design. In particular, the support surface can extend in a conical direction around the valve opening. Due to the round design of the contact surface, the valve body can rest on the support surface all the way around, especially completely, even when tilted.

Furthermore, it can advantageously be provided that the counter-guide element comprises a cylindrical interior, in which the guide element is arranged so as to be moveable. The interior can be hollow and/or surrounded by the counter-guide element. The counter-guide element can advantageously be designed to be tubular. At least sections of the guide element can feature a cylindrical shape in order to be guided in the counter-guide element. As a result, the guide element can be guided linearly in the counter-guide element. When tilting, guidance in various spatial directions can thereby be ensured.

In a valve device according to the invention, it is also conceivable that a magnetic drive unit be provided for moving the guide element, the guide element in particular being designed as a magnetic armature. The drive unit can generate a magnetic drive force to move the guide element and the valve body. The magnetic drive unit can, for example, comprise an electric coil to move the magnetic armature. With a magnetic drive unit in particular, it is advantageous to keep a gap in the guide unit small in order to reduce a coil and/or current requirement of the drive unit. Alternatively, however, other drives, such as an electric motor, are conceivable for moving the guide element.

Preferably, it can be provided that the valve body is biased into the closed state by a biasing unit, the biasing unit being designed to bring the valve unit into the closed state when the drive unit is de-energized. The biasing unit can, e.g., comprise a spring, in particular in the form of a compression spring. Preferably, the valve body can be moved against the fluid flow and against the biasing unit in order to transfer the valve unit to the open state. As a result, the valve unit is able to be self-locking. In particular, if the drive unit fails, e.g. due to a technical defect, the biasing unit can also ensure that the fluid does not flow through the valve device in an uncontrolled manner. As a result, the safety of the fluid system can be improved.

Furthermore, it can be advantageously provided that the tilting means surrounds the guide element like a ring. The tilting means can in this case be part of the guide element or the counter-guide element. Due to the ring-like design around the guide element, a tolerance-related offset between the valve seat and/or the valve opening and the valve body in different spatial directions can be compensated.

In a valve device according to the invention, it is conceivable that the tilting means be formed by a rolling section on the guide element or on the counter-guide element, the rolling section in particular being designed in the form of a ball ring. The rolling section can, for example, be formed by a shape of the guide element or the counter-guide element. For example, the outer contour of the guide element or the counter-guide element can define the rolling section. The rolling section enables the guide element to roll on the counter-guide element when the guide element tilts in relation to the counter-guide element and/or the movement axis. A defined tilting movement can be enabled thereby.

Within the scope of the invention, it is also conceivable that the rolling section is arranged, preferably centrally, between two ends of the guide element, in particular whereby the guide element comprises a conical guide surface between each of the two ends and the rolling section, which can be placed against the counter-guide element when the guide element is tilted relative to the counter-guide element and/or the movement axis. The guide surfaces can therefore form cones that are opposite to each other. The conical design can increase the gap between the guide element and the counter-guide element in the direction of the ends and thus the space for tilting the guide element. The conical design of the guide surface can enable tolerance compensation in different spatial directions.

Furthermore, it can advantageously be provided that the guide surfaces extend tangentially to the rolling section. Due to the tangential extent of the guide surfaces, the guide surfaces can preferably be placed against the counter-guide element on at least one side at a maximum tilting angle of the guide element. As a result, linear guidance of the guide element is guaranteed and, at the same time, the gap between the guide element and the counter-guide element can remain narrow. For example, a magnetic force required to move the guide element can depend on an average dimension of the gap.

According to a further aspect of the invention, a fluid system is provided. The fluid system comprises a fluid tank for storing a fluid and a utilization device for utilizing the fluid. The fluid system further comprises a valve device according to the invention, which is arranged between the fluid tank and the utilization device.

Therefore, a fluid system according to the invention has the same advantages as those already described in detail with reference to a valve device according to the invention. The fluid system can, e.g., be designed for installation in a vehicle. For example, the utilization device can comprise a fuel cell system, in particular for driving the vehicle. In particular, the utilization device can also be referred to as a consumption device. The fluid can be stored in the fluid tank, in particular under high pressure. The valve device can be used to influence, in particular regulate, the flow of fluid from the fluid tank to the utilization device. It is conceivable that the fluid system comprises a control unit for controlling a drive unit of the valve device.

BRIEF DESCRIPTION OF THE DRAWINGS

Further advantages, features, and details of the invention arise from the following description, in which exemplary embodiments of the invention are described in detail with reference to the drawings. In this context, the features mentioned in the claims and in the description can each be essential to the invention individually or in any combination. Schematically shown are:

DETAILED DESCRIPTION

In the following description of several exemplary embodiments of the invention, identical reference signs are used for identical technical features, even in different exemplary embodiments.

Figure 1:
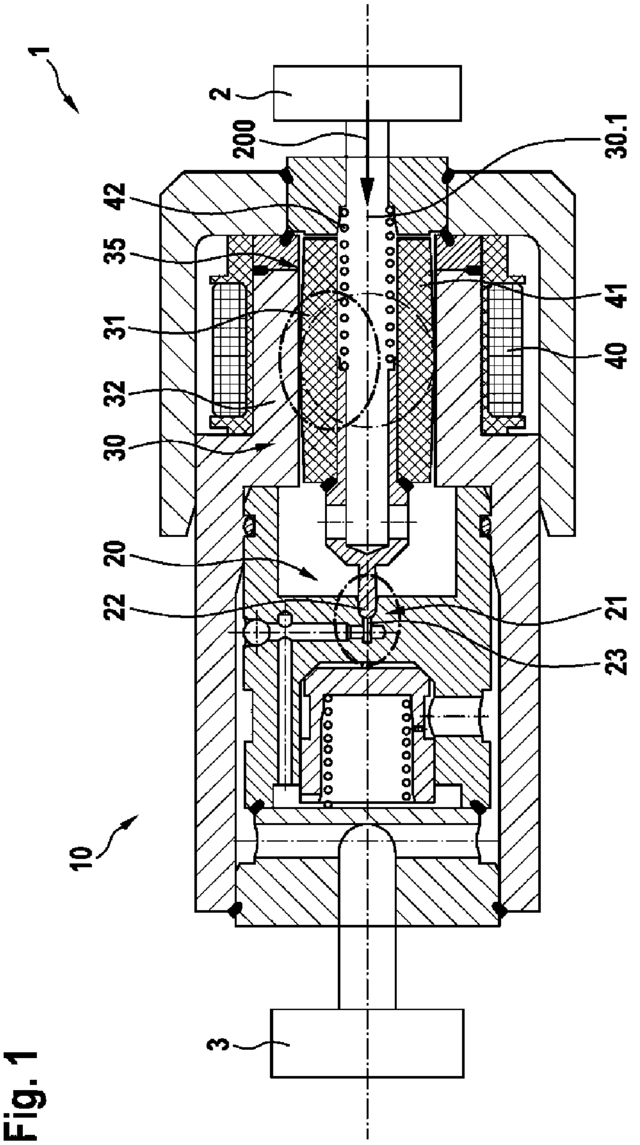
FIG. 1 a fluid system according to the invention with a valve device according to the invention in a first exemplary embodiment, FIG. 2 a valve unit of the valve device in a detailed view, FIG. 3 a valve body of the valve unit in a plan view, and FIG. 4 a tilting means of the valve device.

FIG. 1 shows a fluid system 1 according to the invention in a first exemplary embodiment. The fluid system 1 comprises a fluid tank 2 for storing a fluid and a utilization device 3 for utilizing the fluid. The fluid can preferably be hydrogen. The utilization device 3 can, for example, comprise a fuel cell system. Furthermore, a valve device 10 according to the invention is arranged between the fluid tank 2 and the utilization device 3 in order to influence a fluid flow 200 of the fluid from the fluid tank 2 to the utilization device 3.

Figure 2:
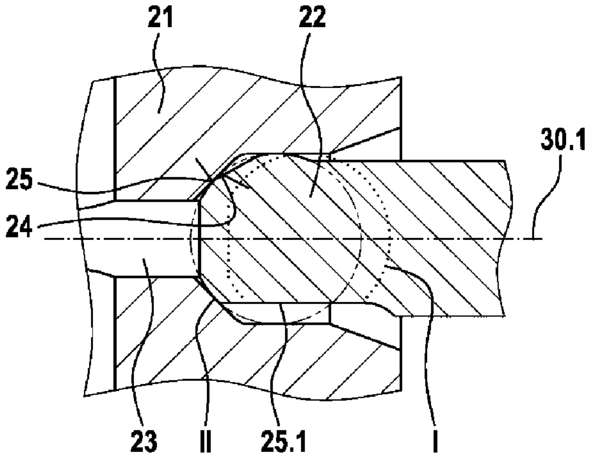

The valve device 10 comprises a valve unit 20 with a valve seat 21 shown in FIG. 2 and a valve body 22, which contacts the valve seat 21 in a closed state II of the valve unit 20 to close a valve opening 23. In an open state I for clearing the valve opening 23 for a fluid flow 200 in the fluid system 1, the valve body 22 is arranged to be remote from the valve seat 21. To transfer the valve unit 20 from the open state I to the closed state II and vice versa from the closed state II to the open state I, the valve body 22 can be moved along a movement axis 30.1. For this purpose, the valve device 10 comprises a guide unit 30, which preferably forms a linear guide.

The guide unit 30 comprises a guide element 31 which is connected to the valve body 22 and can be moved with the valve body 22 when transferring the valve unit 20 from the open state I to the closed state II and vice versa. Furthermore, the guide unit 30 comprises a counter-guide element 32 for guiding the guide element 31 along the movement axis 30.1. The counter-guide element 32 is preferably stationary. To guide the guide element 31, the counter-guide element 32 comprises a cylindrical interior 35 in which the guide element 31 is arranged so as to be moveable.

In order to drive the guide element 31 with the valve body 22, the valve device 10 further comprises a magnetic drive unit 40 for moving the guide element 31. At least sections of the guide element 31 are in this case designed as an magnetic armature 41. Furthermore, a gap 36 is formed between the guide element 31 and the counter-guide element 32 in order to enable a relative movement between the guide element 31 and the counter-guide element 32 by the magnetic drive unit 40. The valve body 22 is in this case biased into the closed state II by a biasing unit 42. For increased safety in the event of a fault, the biasing unit 42 is designed to bring the valve unit 20 into the closed state II when the drive unit 40 is de-energized.

Figure 3:
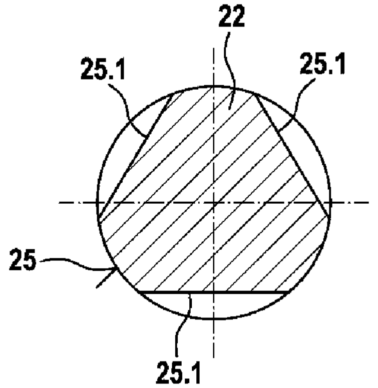

As shown in FIG. 2, the valve seat 21 comprises a support surface 24, at least sections of which are conical, for the valve body 22. The valve body 22 further comprises a contact surface 25, at least sections of which are partially round. In the closed state II, the contact surface 25 rests on the support surface 24 in the closed state II of the valve unit 20. The contact surface 25 and/or the support surface 24 can preferably comprise a hardened steel. As shown in FIG. 3 in a sectional plan view of the valve body 22, the contact surface 25 can comprise lateral, e.g. flat, recesses 25.1, whereby the fluid can advantageously flow past the valve body 22 in the open state I of the valve unit 20 without a large valve stroke being required.

Figure 4:
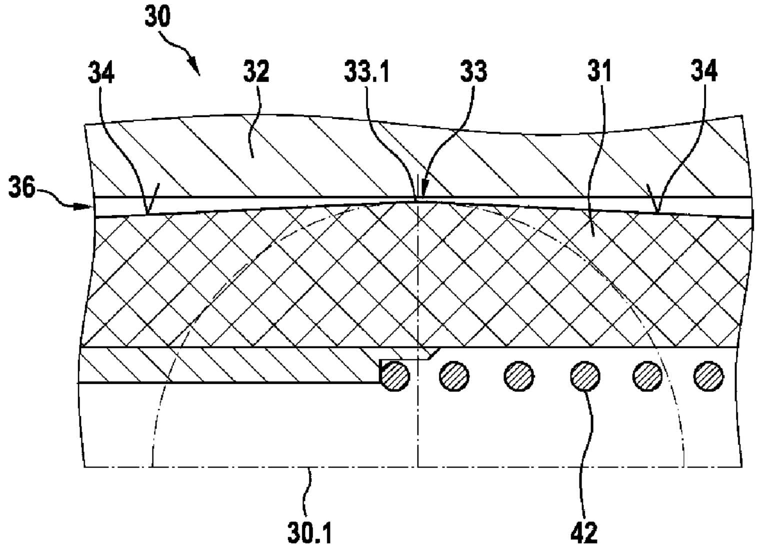

In order to compensate for tolerance-related coaxiality between the valve seat 21, the valve opening 23, the movement axis 30.1 and/or the valve body 22, the guide unit 30 comprises a tilting means 33, as shown in FIG. 4. Using the tilting means 33, the guide element 31 can be tilted relative to the movement axis 30.1 for contact between the valve seat 21 and the valve body 22 to the counter-guide element 32 and/or to the movement axis 30.1. Due to the round, preferably spherical design of the contact surface 25, the valve body 22 can contact the support surface 24 at an angle, wherein a circumferential seal of the valve opening 23 is not or hardly impaired by the contact between the support surface 24 and the contact surface 25.

Furthermore, the tilting means 33 is formed by a rolling section 33.1 on the guide element 31, which surrounds the guide element 31 like a ring. The rolling section 33.1 is in this case designed as a ball ring. Furthermore, the rolling section 33.1 is arranged between two ends of the guide element 31. The guide element 31 comprises a conical guide surface 34 between each of the two ends and the rolling section 33.1, which can be placed against the counter-guide element 32 and/or to the movement axis 30.1 when the guide element 31 is tilted relative to the counter-guide element 32. The guide surfaces 34 each extend tangentially to the rolling section 33.1, so that the guide surfaces 34 are placed against the counter-guide element 32 when the guide element 31 tilts.

In the illustrated exemplary embodiment, the tilting means 33 is located on the guide element 31. However, it is also conceivable that the tilting means 33 is arranged on the counter-guide element 32, and the guide element 31 extends in a straight manner.

The invention claimed is:

1. A valve device (10) for a fluid system (1) having:

a valve unit (20) with a valve seat (21) and a valve body (22), which contacts the valve seat (21) in a closed state (II) of the valve unit (20) to close a valve opening (23) and in an open state (I) is remote from the valve seat (21) to clear the valve opening (23) for a fluid flow (200) in the fluid system (1), a guide unit (30) having a guide element (31) which is connected to the valve body (22) and can be moved along a movement axis (30.1) to transfer the valve unit (20) from the closed state (II) into the open state (I), and having a counter-guide element (32) for guiding the guide element (31) along the movement axis (30.1), wherein the guide unit (30) comprises a tilting means (33), by which the guide element (31) can be tilted relative to the movement axis (30.1) for the contact between the valve seat (21) and the valve body (22);

wherein the tilting means (33) is formed by a rolling section (33.1) on the guide element (31)

wherein the rolling section (33.1) is arranged between two ends of the guide element (31), wherein the guide element (31) comprises a conical guide surface (34) between each of the two ends and the rolling section (33.1), which can be placed against the counter-guide element (32) when the guide element (31) is tilted.

2. The valve device (10) according to claim 1, wherein the valve seat (21) comprises a support surface (24), at least sections of which are conical, for the valve body (22), wherein the valve body (22) comprises a contact surface (25), at least sections of which are round, wherein the contact surface (25) rests on the support surface (24) in the closed state (II) of the valve unit (20).

3. The valve device (10) according to claim 1, wherein the counter-guide element (32) comprises a cylindrical interior (35), in which the guide element (31) is arranged so as to be moveable.

4. The valve device (10) according to claim 1, wherein a magnetic drive unit (40) is provided for moving the guide element (31), wherein the guide element (31) is configured as a magnetic armature (41).

5. The valve device (10) according to claim 4, wherein the valve body (22) is biased into the closed state (II) by a biasing unit (42), wherein the biasing unit (42) is configured to bring the valve unit (20) into the closed state (II) when the drive unit (40) is de-energized.

6. The valve device (10) according to claim 1, wherein the tilting means (33) surrounds the guide element (31) in a ring-like manner.

7. The valve device (10) according to claim 1, wherein the guide surfaces (34) each extend tangentially to the rolling section (33.1).

8. A fluid system (1) having:

a fluid tank (2) for storing a fluid, a utilization device (3) for utilizing the fluid, and a valve device (10) according to claim 1, which is arranged between the fluid tank (2) and the utilization device (3).

* * * * *